Patented July 2, 1940

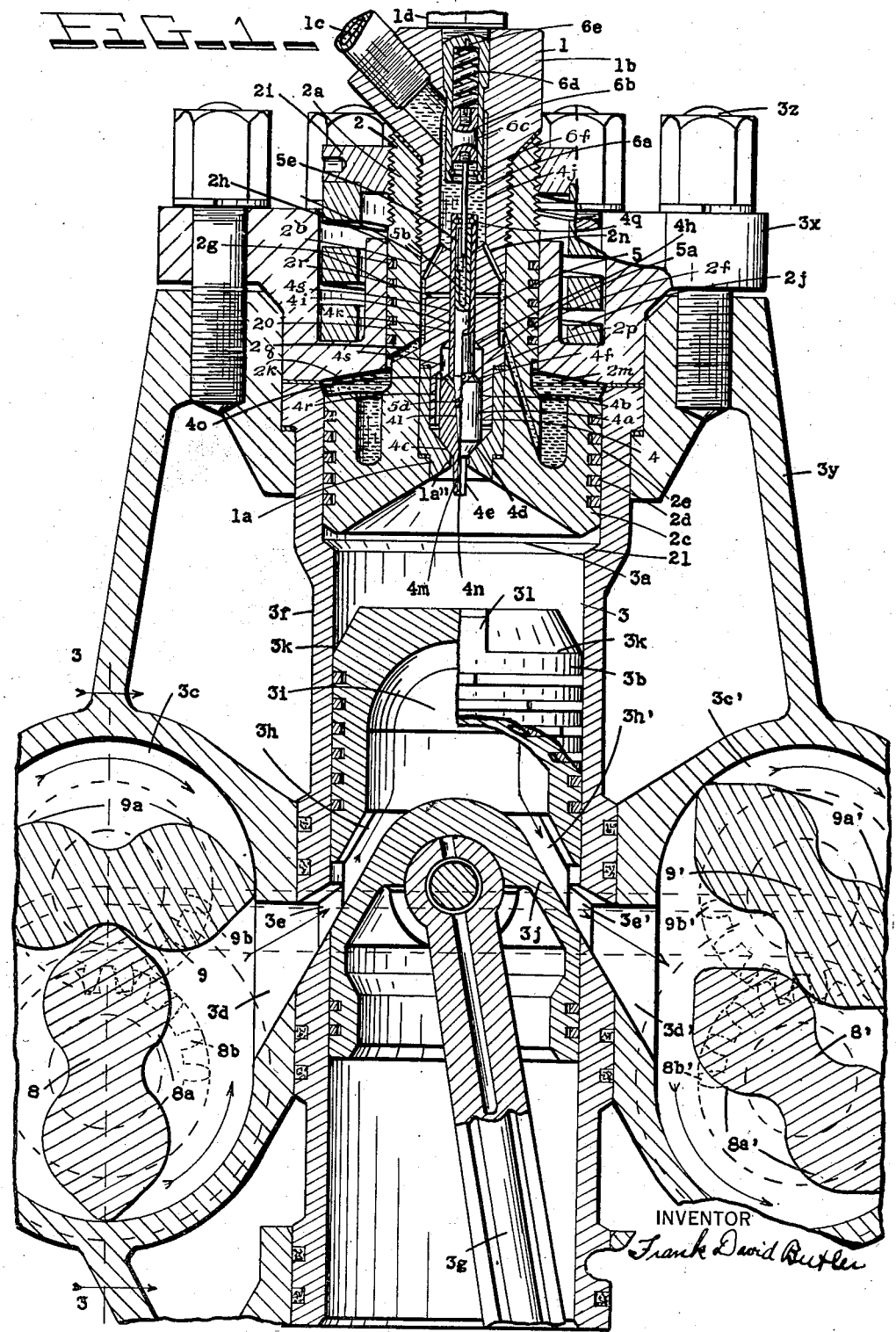

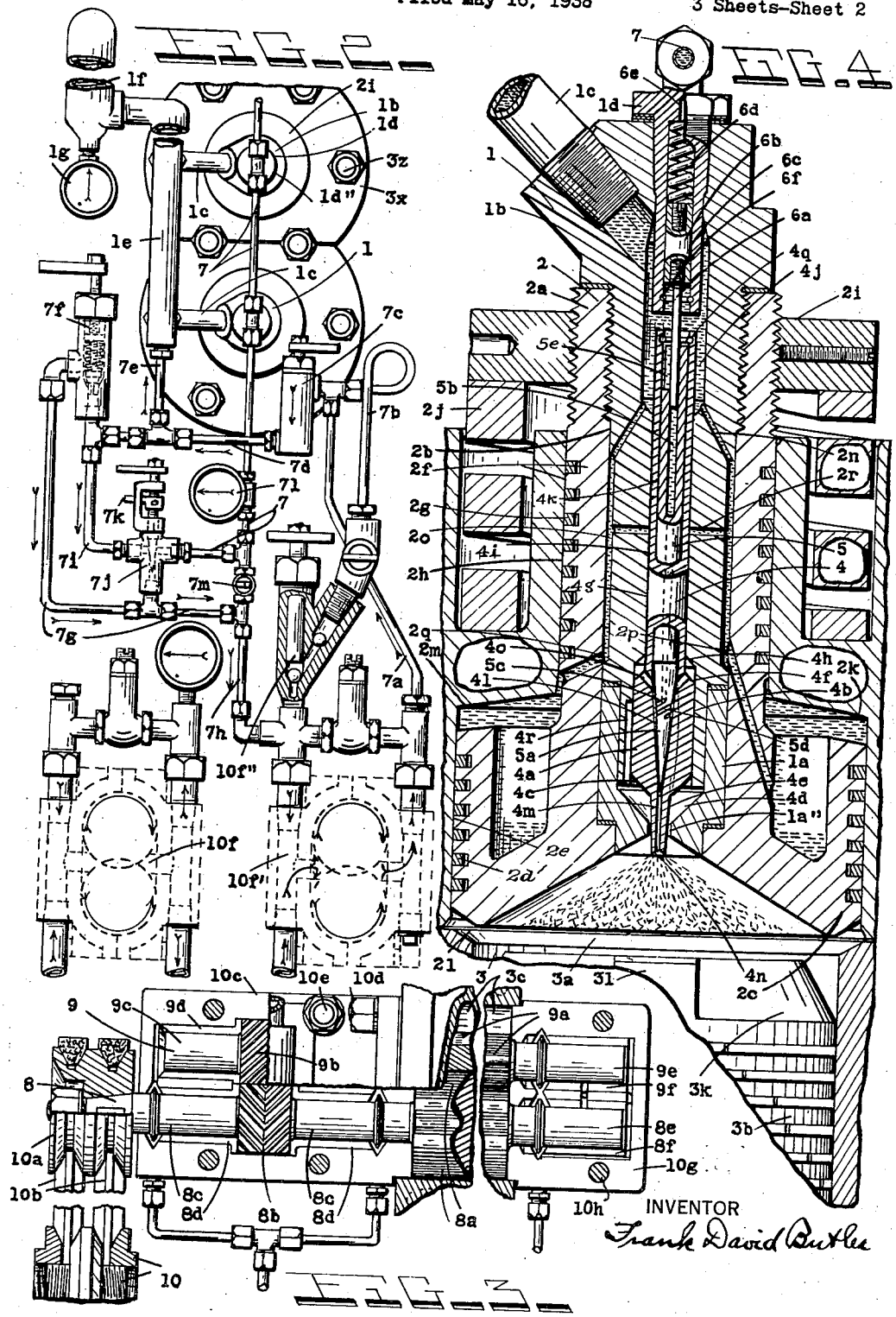

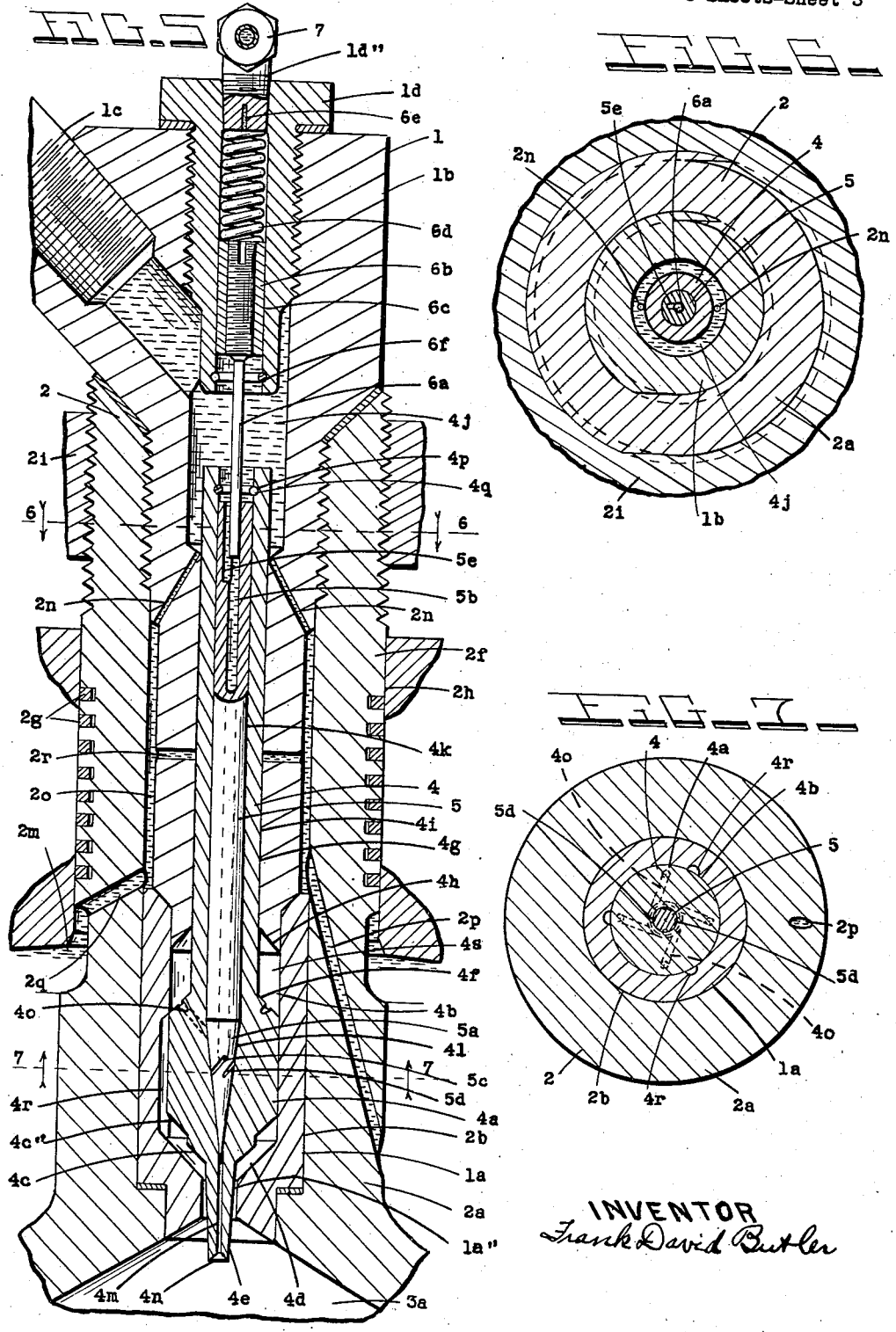

2,206,027

UNITED STATES PATENT OFFICE 2,206,027

INTERNAL COMBUSTION ENGINE

Frank David Butler, United States Navy

Application May 16, 1938, Serial No. 208,219

2 Claims. (Cl. 123—139)

(Granted under the act of March 3, 1883, as amended April 30, 1928; 370 O. G. 757)

While my invention relates to the type of engine assembly mentioned in the foregoing, it relates more particularly to and provides a two stroke cycle internal combustion engine wherein the ingress combustion air thereto is supplied under a positive pressure by an unique rotary pump simultaneously as the expended gas therefrom is extracted by a similar but negative pressure egress or scavenging pump; wherein the piston or pistons of such engine are cooled internally by such ingress and egress pumps operating in combination; wherein said ingress air supplied to said combustion chamber is compressed in the latter by the engine piston and after it has been compressed to a predetermined pressure automatically actuates a liquid fuel atomizing and injecting unit which latter traps a small quantity of said ingress air under pressure, compresses it to an appreciably higher pressure than the air remaining in such combustion chamber, and injects it, along with the highly atomized liquid fuel charge, back into such combustion chamber; wherein such liquid fuel injecting unit is mounted centrally in and is combined with a hydraulically operated combustion chamber regulating device through which latter the compression ratio of such engine may be increased or decreased at any time at will; and, where in such engine, topped crude petroleum oils, having a relatively low specific gravity and viscosity, may be used as the motive power thereof. The solution of the major problem of burning such oils efficiently in such engines and simultaneously maintaining a relatively high horse power per pound weight factor, with its many minor resulting problems, is the major concept in my present invention along with the provision of simple, durable and relatively inexpensive means for its practical and commercial accomplishment.

More specific concepts of my invention in an internal combustion engine contemplate; (a) the provision of a relatively inexpensive and efficient means for hydraulically and remotely varying (at any time at will) the compression ratio of the piston and cylinder unit or (collectively) units of such engine; (b) the provision of relatively inexpensive and efficient means for minutely atomising, highly agitating and injecting the liquid fuel into the combustion chamber of each cylinder unit of such engine automatically and pneumatically by and through actuation motive power received from the compression and combustion pressures within such combustion chamber or chambers, and in proper timing with the rotating and reciprocating elements of such engine; (c) the provision of means for utilizing the hydraulic pressure of means (a) for sealing (against leakage) the major moving element of provision (b); (d) the provision of means for maintaining the proper timing mentioned in provision (b) during the varying regulating adjustments provided under provision (a); (e) the provision of means for isolating, trapping and compressing a sufficient quantity of compressed air or combustion gas from each of said combustion chambers (by and through its respective fuel injection assembly) necessary for the proper pneumatic atomization and injection of each liquid fuel charge thereinto; (f) the provision of means for hydraulically and remotely regulating the quantity of fuel per injection charge of such fuel injection assembly or assemblies mentioned under provision (b); (g) the provision of unique means for supplying the ingress air (under a positive pressure above atmospheric pressure) to, and simultaneously extracting (by and through a negative pressure below atmospheric pressure) the expended or egress gas from the cylinder or cylinders of such engine; (h) the provision of means for utilizing the means of provision (g) for internally cooling the piston or pistons of such engine; (i) the provision of means for supplying the necessary hydraulic pressure for means of provisions (a), (c) and (f), the necessary fuel for provision (b), and silencing the drive gears of provision (g) by forming liquid fuel and lubricating oil pressure supply pumps of such drive gears of the latter provision; (j) the provision of means for combining the foregoing provision means in said internal combustion engine; and (k), the provision of means comprising minor new and useful entities which practically, commercially, efficiently, and economically practice, in the manner found by me thus far in the development of my invention to be most advantageous in each of the foregoing, and other respects which will more clearly appear, and be understood by those skilled in this art, from the accompanying drawings and the following description, and appended claims.

It will be readily appreciated by those skilled in this art, after understanding my invention, that various changes may be made in the means disclosed herein which will produce the same results in practically the same manner without digressing from my inventive concept or sacrificing any of its outstanding inherent advantages.

With reference to the drawings:

Fig. 1 is a transverse section through one of the piston and cylinder assemblies of a liquid fuel powered, two stroke cycle, marine type of internal combustion engine equipped with my invention, and illustrates the compression regulating device assembly thereof at one half travel position of regulation, the moving elements of the fuel atomizing and injecting device assembly in their full inward or normal closed position of travel and with the hydraulically, remotely controlled fuel quantity regulating plunger assembly (of the latter) at one half travel position of regulation, and the engine piston assembly at approximately three-fourths of its outward travel and approaching its firing dead center and in the act of having its internal surface cooled by air under a positive pressure passing from the ingress air blower pump therethrough and into the negative pressure egress scavenging blower or pump as diagrammatically illustrated by the arrows.

Fig. 2 is a diagrammatic sketch of the arrangement of the liquid fuel and lubricating oil pumps, and the engine regulating devices connected with the fuel supply system.

Fig. 3 is a reduced longitudinal section as would appear on the dotted lines 3—3 of Fig. 1 and illustrates the parallel V belt, and the (herringbone silent type) gear drive of the ingress and egress blowers or pumps, and the method employed in utilizing these gears simultaneously as such drive gears and as the liquid fuel pump or lubricating oil pump and thus placing them under a forced oil lubrication and causing them to operate silently though meshed closely together.

Fig. 4 is an enlarged detailed section of my combined compression chamber regulating device assembly and liquid fuel automatic and pneumatic atomizing and injecting device assembly and illustrates the former at one half regulation position and the moving elements of the latter at approximately three-fourths of their outward or open position of travel and with the hydraulically, remotely controlled fuel quantity regulating plunger assembly (of the latter) at one half regulating position of control.

Fig. 5 is an enlarged detailed section of a portion of Fig. 4 except with the moving elements of the fuel atomizing and injecting device assembly at approximately one fourth of their outward travel.

Fig. 6 is a transverse section of Fig. 5 as taken on the dotted line 6—6 of the latter figure.

Fig. 7 is similar to Fig. 6 except being taken in the opposite direction and on the dotted line 7—7 of Fig. 5.

In the accompanying drawings, similar numerals and letters represent and indicate similar parts in the several views. The numeral 1 indicates one of the hydraulically and remotely regulated automatically and pneumatically operated fuel atomizing and injecting device assemblies which is mounted centrally in the compression regulator piston assembly 2 and consists of certain stationary and moving elements. The stationary elements of unit 1 consist of an elongated shouldered cylindrically shaped lower or inward end cap 1a, an elongated shouldered cylindrically shaped outward main body 1b, a combined fuel and combustion chamber hydraulic regulating fluid connection 1c secured in the side of the outer end of body 1b, a fuel quantity hydraulic regulating fitting 1d secured in the outer center of body 1b, and suitable gaskets as necessary. This cap 1a and main body 1b fit snugly within a suitable shouldered cylindrically shaped bore 2b, which latter extends throughout the main body 2a of the compression regulating piston assembly 2. The main body 1b is preferably threaded into the outer end of bore 2b.

The moving elements of the assembly 1 consist of a pneumatic pressure operated actuating piston 4 and a combined pneumatically and hydraulically operated fuel atomizing and injecting piston valve 5 assembled together, and a relatively stationary though regulatable fuel metering and injecting plunger 6a, and a hydraulically and remotely controlled fuel quantity regulating piston 6b assembled together. The actuating piston 4 is of the differential area type, is cylindrical in shape, has a plurality of external and internal diameters and consists of an elongated cylindrically shaped enlarged piston portion 4a which fits snugly in and is reciprocable within the cylinder 4b located in the inward end of assembly 1. An inward conically shaped valve face 4c adjoining the inward or combustion chamber end of 4a is normally adapted to contact a similar conically shaped valve seat 4d. The piston portion 4a terminates in a reduced diameter, tapering, elongated cylindrically shaped projection tip 4e having its largest diameter adjoining the smallest diameter or base of valve face 4c and is constantly exposed to the combustion chamber 3a. Tip 4e is appreciably smaller than and thus fits within a suitable cylindrically shaped throat bore 1a'' of the cap 1a and extends therethrough into the combustion chamber 3a. The outward end of piston portion 4a terminates in a conically shaped valve face 4f which in turn terminates at its outward or smaller end in a reduced tubular sleeve 4g. The valve face 4f is adapted to intermittently contact a similar conically shaped valve seat 4h located in the outward end of cylinder 4b. The tubular sleeve 4g fits snugly in and is reciprocable within a suitable bore 4i adjoining the outward end of valve seat 4h and extending therefrom an appreciable distance outward in the intermediate section of main body 1b and terminating in a suitable enlarged cylindrically shaped fuel supply chamber 4j adjoining the outward ends of piston 4 and valve 5. From the outer to approximately the inner end of the sleeve 4g the actuating piston 4 is bored cylindrical and straight and this cylinder 4k terminates at its lower or inward end in a tapering conically shaped seat 4l. This seat 4l in turn terminates at its inward or smaller end in a minute cylindrically shaped orifice 4m extending through tip 4e and terminating in a diverging nozzle 4n. Nozzle 4n terminates at the inward end of said tip and within the combustion chamber 3a of the cylinder 3. Certain other details which are more clearly described later include a plurality of port holes 4o which extend radially through the actuating piston 4 from the shoulder 4f and enter the tapering seat 4l at a tangent to the circumference thereof, as illustrated in Fig. 7, a semi-circular groove 4p machined in and near the outer end of the bore of cylinder 4k, a plurality of by-pass ports 4r located in and extending parallel to the walls of the lower end of cylinder 4b, as illustrated in Figs. 5 and 7, and being somewhat longer than piston 4a, and machine relieving the outer portion of conical shoulder 4c as at 4c'', Fig. 5, to an outside diameter equal to that of sleeve 4g.

The piston valve 5 fits in a slidable manner within the cylinder 4k of piston 4 and consists of a valve face 5a corresponding to seat 4l and adapted to normally contact the latter; a retainer ring 4q located in the semi-circular groove 4p and limiting the upward movement of piston valve 5 within piston 4; a cylindrically shaped fuel injection chamber 5b extending from the outer end thereof to the vicinity of the center of the length of valve face 5a and terminating at that point in a plurality of relatively minute radially extending fuel diffuser ports 5c which latter in turn terminate in valve face 5a in the outward ends of a similar number of minute fuel atomizing grooves 5d which latter extend diagonally downward an appreciable distance in the surface of valve face 5a; and an elongated liquid fuel supply groove 5e adjoining and extending downward in the wall from the outer end of the fuel injection chamber 5b an appreciable distance and adapted to normally form fuel supply communication between such chamber 5b and the fuel supply chamber 4j and to be intermittently closed off by the lower or inward end of the fuel injection plunger 6a.

The fuel metering and injecting plunger assembly consists of an elongated cylindrically shaped fuel metering and injecting plunger 6a which at its downward or inward end fits snugly in and is reciprocable within the fuel injection chamber 5b of the piston valve 5, and during the intermittent reciprocation of piston 4 and piston valve 5 cuts off the previously mentioned liquid fuel communication existing via groove 5e between the chamber 5b and the fuel supply chamber 4j. At its upper or outward end plunger 6a is threaded and thus adjustably secured within a suitable elongated, cylindrically shaped fuel regulating piston 6b. Regulating piston 6b fits snugly in and reciprocates within a suitable cylinder 6c in 1d and bears constantly at its upper or outward end against a suitable coil type resilient spring member 6d interposed between the piston 6b and a suitable plug member 1d" secured to or forming a part of the upper or outward end of fitting 1d. A minute orifice fuel regulating communication port 6e extends through plug 1d" and is in constant communication with the hydraulically controlled fuel regulating means through tubing connection 7. A suitable snap type spring retainer ring 6f fits within a suitable semi-circular groove located in and near the inward end of the wall of cylinder 6c and limits the downward or inward travel of piston 6b in such cylinder during full power operation of the engine.

The compression chamber regulating device assembly 2 includes a main body 2a having a shouldered cylindrical bore 2b extending therethrough and receiving the fuel atomizing and injecting assembly 1 therein. An enlarged cylindrically shaped inward end piston 2c fitted with a plurality of snap type piston rings 2d fits snugly in a reciprocable manner within a suitable cylinder 2e adjoining the engine combustion chamber 3a with its lower end constantly exposed to the latter. A reduced cylindrically shaped outward sleeve end 2f is fitted with a plurality of snap type piston rings 2g and fits snugly in a reciprocable manner within a suitable cylinder 2h adjoining the outward end of cylinder 2e and projects therethrough a considerable distance. A suitable annular shaped internally threaded adjustment collar 2i fits a suitable threaded portion of the projecting outward end of sleeve 2f. A suitable resilient coil spring 2j is interposed between the collar 2i and the outward side of the outward head of the cylinder 2e and normally retains piston 2c in contact with its outward travel limit stop and seal seat 2k located on the inward side of said outward head and adjoining the outward end of cylinder 2e. An annular shaped seat 2l located at the inward end of cylinder 2e adjoining combustion chamber 3a limits the downward or inward travel of and seals piston 2c during the period it is seated downward thereon.

Hydraulic fluid communicates between the liquid fuel supply fitting 1c and the hydraulic fluid pressure chamber 2m via fuel supply chamber 4j thence one of the minute hydraulic fluid communication and control orifice posts 2n which extend diagonally downward in main body 1b from chamber 4j to the annular shaped chamber 2o, thence from chamber 2o into chamber 2m via the down-flow diagonally extending port 2p in lower end of 2a, or on return, up through the up-flow diagonally extending port 2q located opposite to upper end of 2p in 2a, and hydraulic seal communication exists between annular shaped chamber 2o and chamber 4g of piston 4 via the radially extending port holes 2r in 1b, and for the purpose of sealing piston 4 in sleeve 4g.

The combustion ingress air supply pump and the lubricating oil supply pump are combined and mounted on the same shafts as illustrated in Fig. 3, and are identical to the combustion egress gas exhaust pump and the liquid fuel supply pump in combination and mounting. Therefore the former combination only will be described, and the latter will be indicated by an additional apostrophe (') to the indicating symbols of the former. The ingress air supply pump and lubricating oil supply pump and their drive mechanism include an elongated drive shaft 8 and a similarly elongated driven shaft 9 which two are identical in construction except as their name implies. The drive shaft 8 is adapted to be rotated from the engine crank-shaft (not illustrated) at a speed appreciably higher than the latter by and through the relatively large duplex parallel V pulley 10, mounted on the crank-shaft, driving the relatively small duplex parallel V pulley 10a mounted on shaft 8 via the parallel V belts 10b connecting such pulleys. The shafts 8 and 9 are mounted parallel to one another and to the engine crank-shaft and are rotatable within a suitable elliptical shaped pump chamber 3c, located adjacent the intermediate length of and at right angles to the main cylinder or cylinders 3, with their two lobe elastic substance pumping vanes 8a and 9a respectively in mesh with, but not touching, one another and slightly clearing the circular portions of the wall of said pump chamber 3c. The shaft 8 through the herring bone silent type gear 8b drives the shaft 9 by and through meshing snugly with a similar gear 9b, both gears are integral with their respective shafts and are located in the intermediate length of the forward journals 8c and 9c of such shafts respectively. These journals 8c and 9c extend from the forward end of pump chamber 3c to adjoining the smaller pulley 10a and are supported in suitable bearings 8d and 9d respectively, mounted in the forward split housing member 10c secured adjoining the forward end of chamber 3c by bolts 10d and having its halves secured together by bolts 10e. As diagrammatically illustrated in Fig. 2, there is thus provided the lubricating oil supply pump 10f. The after end of shafts 8 and 9 are likewise supported on the rear journals 8e and 9e integral therewith respectively rotatable in the split bearings 8f and 9f respectively. These bearings 8f and 9f are mounted in the after split housing member 10g, secured adjoining the after end of chamber 3c and having its halves secured together with bolts 10h.

The liquid fuel supply pump 10f' is diagramatically illustrated in Fig. 2. A plurality of initial ingress air supply ports and final egress gas exhaust ports, neither illustrated, are located in the walls of the pump chamber 3c and 3c' respectively, opposite and similar to the ingress air cylinder port 3d and egress gas cylinder scavenging port 3d' respectively, which latter are located in the walls of the pump chambers toward the engine cylinder. These cylinder ports 3d and 3d' coincide with suitable continuations thereof 3e and 3e' respectively which extend diagonally through the walls of the elongated cylinder liner 3f and are intermittently opened and closed by and through the reciprocation of the piston 3b in the cylinder 3, by the connecting rod 3g in the usual manner, to thus intermittently supply ingress air under a positive pressure form ingress pump chamber 3c to the inside of piston 3b and to simultaneously extract such air therefrom under a negative pressure into the scavenging pump chamber 3c', as diagrammatically illustrated in Fig. 1, via port 3d and its continuation port 3e thence the ingress air supply port 3h in the intermediate length of the piston 3b thence the cooling chamber 3i, internal to the upper portion of piston 3b, and over the bridge 3j into the egress port 3h' and thence via ports 3e' and 3d into scavenging pump chamber 3c'.

The supply of ingress air to the combustion chamber 3a from ingress pump chamber 3c and the scavenging of the expanded gas from said combustion chamber into scavenging pump chamber 3c' takes place simultaneously as piston 3b nears the bottom of its power stroke. At this time the lower edge of the flanged portion 3k of the upper end of piston 3b passes downward beyond the upper edges of ports 3e and 3e' and allows expanded gas to escape from combustion chamber 3a to scavenging pump chamber 3c', and ingress air to flow from ingress pump chamber 3c into the combustion chamber 3a. As the piston reaches its full downward travel and returns upward, the flanged portion 3k passes upward beyond ports 3e and 3e' and thereby cuts off both ingress and egress communication to and from combustion chamber 3a respectively and results in the ingress air trapped in the latter being compressed therein by said piston 3b during its upward travel stroke in the cylinder 3.

With reference to Fig. 2, the liquid fuel for combustion, hydraulic fluid for combustion chamber regulation, and the hydraulic fluid for fuel injection regulation supply system are connected up as follows: Connections are made between the source of liquid fuel supply and the suction side of the power driven fuel supply pump 10f' and manually operated fuel supply pump 10f''; liquid fuel under pressure may then be supplied by these pumps through the tubing connections 7a or 7b respectively into strainer 7c, thence through tubing connections 7d and 7e respectively into manifold 1e, which latter connects the fittings 1c of the plurality of fuel atomizing and injecting assemblies 1, and simultaneously from strainer 7c via tubing connection 7d into and through the spring loaded manually adjustable pressure regulating valve 7f into drain line 7g and adjoining drain line 7h back to the suction side of said pumps. An air chamber 1f is located at a slight elevation above and is connected to manifold 1e, and a pressure gauge 1g is secured to and registers simultaneously the pressure in the air chamber 1f and the adjustable pressure setting of regulating valve 7f. A tube 7i connects the inlet side of regulating valve 7f and the inlet side of the fuel control needle valve 7j, and tubes 7 connect the outlet side of valve 7j and the fittings 1d or 1d'' of the plurality of fuel atomizing and injecting assemblies 1. Pressure gauge 7l is coupled in so as to register the pressure in the tubes 7. The needle valve 7j is constructed so that liquid fuel fluid for control of assemblies 1 may pass therethrough from tubes 7i to tubes 7 when the needle valve is in one position of regulation or therethrough from the tubes 7 to the drain tube 7g when such needle valve is in a second position of regulation. The stem of the disc of the needle valve 7j is equipped with an adjustable idling speed or minimum pressure drain stop 7k limiting the minimum pressure that may be carried in tubes 7. The by-pass valve 7m is installed between tubes 7 and the drain connection 7g or 7h for the purpose of removing all fluid pressure in tubing 7 whenever desirable.

Having described the construction and connection detail of my engine assembly, and assuming that it is equipped with a power starting means, that its temperature is approximately zero degrees Fahrenheit, and that the fuel and regulating systems are filled with topped crude petroleum oil, the starting and operation of the engine will then be as follows: Open the discharge cock of hand pump 10f'' and with this pump build up pressure on gauges 1g and 7l until by regulating valve 7f the gauge 1g registers approximately 180 pounds per square inch for example and by regulating needle valve 7j the gauge 7l registers approximately 150 pounds per square inch. The higher pressure applied to the liquid fluid in connections 1c and the various chambers, ports, etc., connected therewith will gradually fill the chamber or chambers 2m and will force the piston or pistons 2c downward and into contact with their respective seats 2l by overcoming the tension of their respective springs 2j, and simultaneously therewith, the actuating piston member 4 and piston valve member 5 will be forced downward by the pressure on the liquid fuel in chamber 4j above them and into contact with their respective seats 4d and 4l. The lower pressure applied to the liquid fluid in tubes 7 and the chambers and ports connected therewith with the air of spring 6d will locate the fuel metering and injecting plunger 6a and its piston 6c in opposition to the higher pressure beneath the latter two in the center of their regulation travel, as illustrated in Figs. 1, 4 and 5. The engine is now ready to be started, and under these conditions the columetric capacity of the combustion chamber 3a, with the piston 3b on its firing dead center, would be extremely small, the engine compression ratio would be extremely high, and the final compression temperature would be more than sufficient to ignite atomized liquid fuel even though the initial ingress air temperature was relatively low (0° F.), and the quantity of liquid fuel expended per injection would be 50% of maximum.

The engine crank-shaft is now rotated by the power starting means mentioned in the foregoing. As the piston 3b is moved upward in the cylinder 3 by the crank-shaft connecting rod 3g, the combustion air charge in the combustion chamber 3a above the piston 3b is compressed prior to the arrival of the piston 3b on its firing dead center to a pressure of approximately 800 pounds per square inch. This relatively high pneumatic air pressure in combustion chamber 3a exerting itself against the lower end of actuating piston member 4 having an area equal to the cross-sectional area of throat 1a'' Fig. 1 overcomes the relatively low pressure of 180 pounds per square inch on the liquid fuel in chamber 4j and 5b exerting itself against the relatively large area of the upper ends of said actuating piston member 4 and the piston valve member 5, an area equal to the cross-sectional area of sleeve 4g of 4 and automatically lifts the actuating piston member 4 from its seat 4d.

As the piston 4a of the actuating piston member 4 is lifted from its seat 4d by the highly compressed elastic substance in combustion chamber 3a, this elastic substance immediately equalizes with the compressible elastic substance in the annular shaped compression chamber 4s above piston 4a in cylinder 4b via throat 1a'' into the lower end of cylinder 4b, thence via the plurality of by-pass grooves 4r located in the walls of cylinder 4b and extending around or by-passing piston 4a into the compression chamber 4s. As this highly compressed elastic substance in combustion chamber 3a exerts itself against the relatively large projected area of the lower end of piston 4a, an area equal to the cross-sectional area of piston 4a, the actuating piston member 4 carrying with it the piston valve member 5 is forced rapidly upward thereby, and as the upper end edge of the piston 4a passes upward beyond the upper edges of grooves 4r, illustrated in Fig. 5, the previously mentioned equalization communication existing between combustion chamber 3a and compression chamber 4s is closed off by piston 4a, and thus this equalized elastic substance in the latter chamber is trapped therein and is recompressed therein as the actuating piston member 4 continues upward to an appreciably higher pressure than the compressed elastic substance remaining and contained in the combustion chamber 3a. During the period the actuating piston member 4 is moving upward from the position in which it is illustrated in Fig. 5 to the position in which it is illustrated in Fig. 4, the lower end of the fuel communication groove 5e in 5 passes upward beyond the extreme lower end of the fuel metering and injecting plunger 6a and thereby traps the liquid fuel in chamber 5b beneath the end of the plunger 6a and causes the fuel to be displaced therefrom by the plunger through the radially extending diffuser ports 5c located near the lower end thereof into the outward ends of the semicircular shaped fuel atomizing grooves 5d, which extend diagonally downward in the outer surface of the tapering disc valve face 5a of valve 5. As the lower end of groove 5e passes upward beyond the lower end of the plunger 6a a hydraulic pressure is formed on the liquid fuel in chamber 5b, ports 5c and grooves 5d, and such liquid fluid under such hydraulic pressure exerts itself against the tapering face of seat 4l against an area equal to the downward projected area of grooves 5d towards such tapering face of seat 4l and thereby overcomes the downward pressure of the liquid fuel in chamber 4j exerting itself against the annular shaped cross-sectional area of the upper end of piston valve 5, and thus forces the piston valve 5 upward in piston 4 until its upper end strikes the snap ring 4q and its valve face 5a is separated from the valve seat 4l, thereby allowing the liquid fluid under hydraulic pressure to flow from chamber 5b through ports 5c and grooves 5d respectively into the space separating said valve face 5a and the valve seat 4l. This hydraulic pressure forces valve 5 upward in piston 4, being assisted in such movement thereof by the pneumatic air pressure in combustion chamber 3a exerting itself against the extreme lower end of valve face 5a, an area equal to the cross-sectional area of orifice 4m, and by the pressure of the elastic substance being compressed in compression chamber 4s exerting itself through ports 4o against the tapering face of valve face 5a, an area equal to the upward projected area of ports 4o towards tapering valve face 5a. As the valve face 5a is lifted from its seat 4l, as previously described, and the liquid fuel is forced into the space therebetween, the highly compressed elastic substance in chamber 4s and in the adjoining diagonal ports 4o passes likewise therebetween and the two are united therein and travel downward in a circular path, due to the angle of said ports 4o and said grooves 5d, thence through the minute orifice 4m and diverging nozzle 4n respectively into the space in combustion chamber 3a, such space forming a whirling chamber for the elastic substance and liquid fuel as the former increases in velocity as it drops in pressure in passing from the compression chamber 4s to combustion chamber 3a. As this highly agitated, minutely atomized, whirling mixture of such elastic substance and liquid fuel enters the combustion chamber 3a, it is ignited by the intense heat of the highly compressed air therein, and combustion follows. This combustion forces the piston 3b downward on its power stroke, and the elastic substance and liquid fuel injection continues as piston 3b is thus forced downward, such continuation of such injection as to timing depending principally upon the relation existing between the opposite extreme sizes of compression chamber 4s and orifice 4m, or the time required for practically all the elastic substance to pass from chamber 4s into chamber 3a.

After the engine has started, the discharge cock of hand pump 10f'' is closed, regulating valve 7f is slacked until pressure on gauge 1g registers 90 pounds per square inch for example, and needle valve 7j is set in the idling speed position of regulation wherein the pressure registering on gauge 7l should be about 45 pounds per square inch. This reduction in pressure of the liquid fuel in connection 1c and fuel supply chamber 4j connected with gauge 1g, and the relatively greater reduction in pressure of the liquid fuel in tubing connection 7 and fitting 1d or 1d'' connected with gauge 7l, cause the fuel injection plunger piston 6b to seek a higher level in cylinder 6c and thus reduces the depth of the projection of plunger 6a in chamber 5b and consequently decreases the quantity of fuel expended per injection charge. This reduction in pressure of the liquid fuel in chamber 4j also causes the compression chamber regulator assembly 2 to gradually seek a higher level in the cylinders 2m opposing the tension of spring 2j leaks off therefrom and the connections therewith into the chamber 4j through the minute orifices 2n, and consequently results in increasing the clearance volume and decreasing the compression ratio of the engine. To stop the engine, the valve 7m is opened thus reducing the pressure on gauge 7l to zero and allowing the pressure of the liquid fuel in chamber 4j to force the plunger 6a with its piston 6b upward to their zero injection position of regulation.

With reference to Fig. 5 and assuming that the actuating piston 4 and piston valve 5 are being forced downward in their respective cylinders by the pressure of the liquid fuel in chamber 4j as the pressure of the products of combustion decreases in combustion chamber 3a and beneath piston 4a, then: as soon as piston 4 is started on its downward travel a partial vacuum tends to be forced in chambers 4s and 5b and the valve 5 instantly seats within piston 4, and as soon as the lower end of plunger 6a is cleared the lower end of groove 5e the chamber 5b becomes replenished with liquid fuel from chamber 4j. Similarly, as soon as the upper ends of grooves 4r clear the upper end of piston 4a the chamber 4s becomes replenished with a quantity of the elastic substance, non-oxygen, products of combustion from chamber 3a, and as valve face 4c of piston 4 contacts its seat 4d, this elastic substance becomes equalized in pressure on either end of the enlarged diameter portion of piston 4a, due to the fact that the outside diameters of valve face 4c and sleeve portion 4g are equal, and thus prevents an undesirable pressure difference on either end of said piston 4a.

During the period the engine is in operation, the chamber 2m becomes a liquid fuel heater and there exists a slight continuous thermal circulation of liquid fuel from fuel chamber 4j to the chamber 2m and return via the minute orifices 2n.

The orifices 2n are purposely made minute in size so as to prevent pulsating movement of assembly 2 during changes in pressure within combustion chamber 3a, likewise the orifice 6e is purposely made minute in size so as to prevent pulsating movement of the piston 6b during changes in pressure in fuel supply chamber 4j due to the intermittent displacement in the latter of the upper ends of piston 4 and valve 5. All connections between fuel chamber 4j and air chamber 1f are constructed relatively large so that such pressure pulsation in fuel chamber 4j may be absorbed or cushioned by the air in chamber 1f.

The cross-sectional area of sleeve 4g should normally be about four times the cross-sectional area of the throat opening 1a". This will result in the pressure on the fuel in chamber 4j being carried at approximately one-fourth of the compression pressure in the combustion chamber 3a. Likewise the various relations existing between the tension of spring 2j, the pressure carried in fuel supply chamber 4j and the size of the orifices 2r should be such that during approximately the last one-tenth of the compression stroke and the first one third part of the power stroke a small quantity of liquid fuel should flow from chamber 2m to chamber 4j, and during the remaining portions of said compression and power strokes this small quantity of liquid fuel should be replenished in chamber 2m from chamber 4j. The hydraulic pressure on the liquid fuel in chamber 2m and in the ports 2r which latter seal the sleeve portion 4g of piston 4 within the cylinder 4i is normally considerably higher than the varying pressures in combustion chamber 3a and likewise varies with such changes in pressures in the latter chamber.

It is understood that the engine should have a relief valve means connected with combustion chamber 3a, and certain other details could have been included, however they are not considered a part of this invention.

Though more than one device is illustrated, they are all my original ideas and are so united and described in combination.

The invention herein described may be manufactured and used by or for the Government of The United States of America for governmental purposes without the payment to me of any royalty thereon or therefor.

I claim:

1. In a liquid fueled internal combustion engine, means operated by compression pressures for atomizing and injecting a fuel charge into the combustion chamber of the engine in proper timing comprising a cylinder member in tandem relation with the combustion chamber, a hollow piston in said cylinder member, yieldable means urging said piston member toward the combustion chamber and permitting said piston member to retract under combustion chamber pressure, a fuel injection member extending through said hollow piston member in fixed relation to said piston member, a bore extending through said fuel injection member and having an enlarged counterbored chamber within said fuel injection member adjacent and connected to the combustion chamber end thereof, a fuel supply bore extending into said fuel injection member at the other end thereof, a smaller counterbore connecting said enlarged counterbored chamber to said fuel supply feeding bore, an actuating plunger slidably reciprocatable within said connecting bore, an enlarged piston portion formed on said actuating plunger and reciprocatable within said counterbored chamber, said counterbored chamber having a reduced end away from the combustion chamber end into which said enlarged piston portion may snugly enter and then trap combustion chamber gases therewithin, said actuating plunger being hollow and having a fuel discharge opening leading toward the combustion chamber, a valve seat within said enlarged piston portion, an opening extending through said enlarged piston portion from the entrapment chamber to said valve seat, a hollow valve member reciprocatable within said hollow plunger, a valve face on said valve member adapted to seat against said valve seat, openings extending from said valve face to the hollow interior of said valve member, the hollow interior of said valve member connecting to said fuel supply bore and a rod extendable part way into the hollow interior of said valve member to entrap fuel in said valve as said valve member is reciprocated by the motion of said slidable piston, and thereby force fuel through said valve face against said valve face to commingle with and be atomized by the entrapped combustion gases forced therethrough by the reciprocation of said actuating plunger under compression pressure and force the atomized fuel through the discharge opening into the combustion chamber.

2. In a liquid fuel internal combustion engine, means operated by compression pressures for injecting a fuel charge into the combustion chamber of the engine in proper timing comprising a differential cylinder member, a differential piston member slidably mounted in said differential cylinder member, said differential piston member having an enlarged piston portion fitting snugly within the larger portion of said differential cylinder and normally movable toward and seating away from the combustion chamber of the engine, a sleeve-shaped reduced portion of said differential piston member fitting snugly within the smaller portion of said differential cylinder and extending away from said combustion chamber and said larger cylinder portion, a fuel reservoir formed between said differential cylinder and said differential piston, said reservoir extending into said differential piston toward the combustion chamber to extract heat from the combustion chamber to the fuel, a fuel atomizing and feeding means within said sleeve-shaped portion of said differential piston comprising an innermost bored valve member terminating in a valve face at the inward end, said valve member having a bore extending therethrough and opening into said valve face, a fuel plunger extending into said bore at the other end, a fuel source leading to and from said reservoir and to said bore, said plunger entrapping a quantity of fuel in said bore to force a quantity of fuel through the valve face opening as said valve is reciprocated, a hollow valve actuating plunger within said sleeve encompassing said valve, a valve seat within said hollow plunger for said valve face, a fuel injection opening leading from said valve seat to the combustion chamber, a differential piston enlargement on said plunger, a chamber within which said piston enlargement is reciprocatable, an opening connecting said chamber through said piston enlargement to said valve seat, means connecting the combustion chamber to the piston enlargement chamber to entrap a small quantity of combustion chamber gases within said piston enlargement chamber, yieldable means urging said differential piston member toward the combustion chamber and permitting it to retract under combustion chamber pressure, whereby to cause relative reciprocation of said fuel feeding and atomizing valve and said actuating plunger to feed fuel therethrough and to atomize said fuel being fed therethrough under pressure of the entrapped combustion product from the plunger chamber through the valve seat.

FRANK DAVID BUTLER.